US012572652B1

(12) United States Patent
Escobar

(10) Patent No.: US 12,572,652 B1
(45) Date of Patent:  Mar. 10, 2026

(54) ANTIHACKER DIGITAL TAMPER SWITCH TO TRACK CARGO BEING TRANSPORTED

(71) Applicant: Alberto David Escobar, Cali (CO)

(72) Inventor: Alberto David Escobar, Cali (CO)

(73) Assignee: Navisaf S.A.S., Cali (CO)

( * ) Notice: Subject to any disclaimer, the term of this patent is extended or adjusted under 35 U.S.C. 154(b) by 56 days.

(21) Appl. No.: 18/912,673

(22) Filed: Oct. 11, 2024

(51) Int. Cl.
　　*G06F 21/56* (2013.01)
　　*H04W 4/029* (2018.01)
(52) U.S. Cl.
　　CPC ............ *G06F 21/56* (2013.01); *H04W 4/029* (2018.02); *G06F 2221/034* (2013.01)
(58) Field of Classification Search
　　CPC ... G06F 21/56; G06F 2221/034; H04W 4/029
　　See application file for complete search history.

(56) References Cited

U.S. PATENT DOCUMENTS

| | | | | |
|---|---|---|---|---|
| 7,498,938 | B2 * | 3/2009 | Ulrich | G06Q 10/08 705/28 |
| 7,969,306 | B2 * | 6/2011 | Ebert | G06Q 10/08 340/572.1 |
| 8,760,274 | B2 * | 6/2014 | Boling | G08G 1/20 340/933 |
| 9,953,530 | B2 * | 4/2018 | Lloreda | G07C 9/00896 |
| 10,694,372 | B1 * | 6/2020 | Whitman | G06F 21/554 |
| 2010/0223090 | A1 * | 9/2010 | Lozito | G06Q 10/0833 340/8.1 |
| 2025/0310852 | A1 * | 10/2025 | Nattar Ranganathan | H04W 4/029 |

FOREIGN PATENT DOCUMENTS

| | | | | |
|---|---|---|---|---|
| DE | 102021128514 A1 * | 5/2022 | | G06F 18/24 |
| EP | 4271013 A1 * | 11/2023 | | H04W 4/021 |

* cited by examiner

*Primary Examiner* — Michael R Vaughan

(74) *Attorney, Agent, or Firm* — John J. Martinez; Martinez Patents PC

(57) ABSTRACT

The invention provides a monitoring system for transported cargo shipment, the vehicle and its operator to prevent cargo loss, wherein the system uses an operator's smartphone application that is activated by a vehicle wireless communicating device, and a cargo communicating device; wherein the smartphone, and these two devices maintain continuous wireless communication, wherein the smartphone application generates dynamic data about the vehicle and the continuous communication among with the two devices; and wherein the application sends the dynamic data to a computer server by means of the internet of things, wherein the continuous wireless communication when interrupted causes a digital switch in the communication devices and the smartphone to change a shared encrypted password to a new password in order to re-establish the communication, wherein if the communication is not re-established an alarm signal is generated by the smartphone application, and an anomaly is reported to the server.

1 Claim, 1 Drawing Sheet

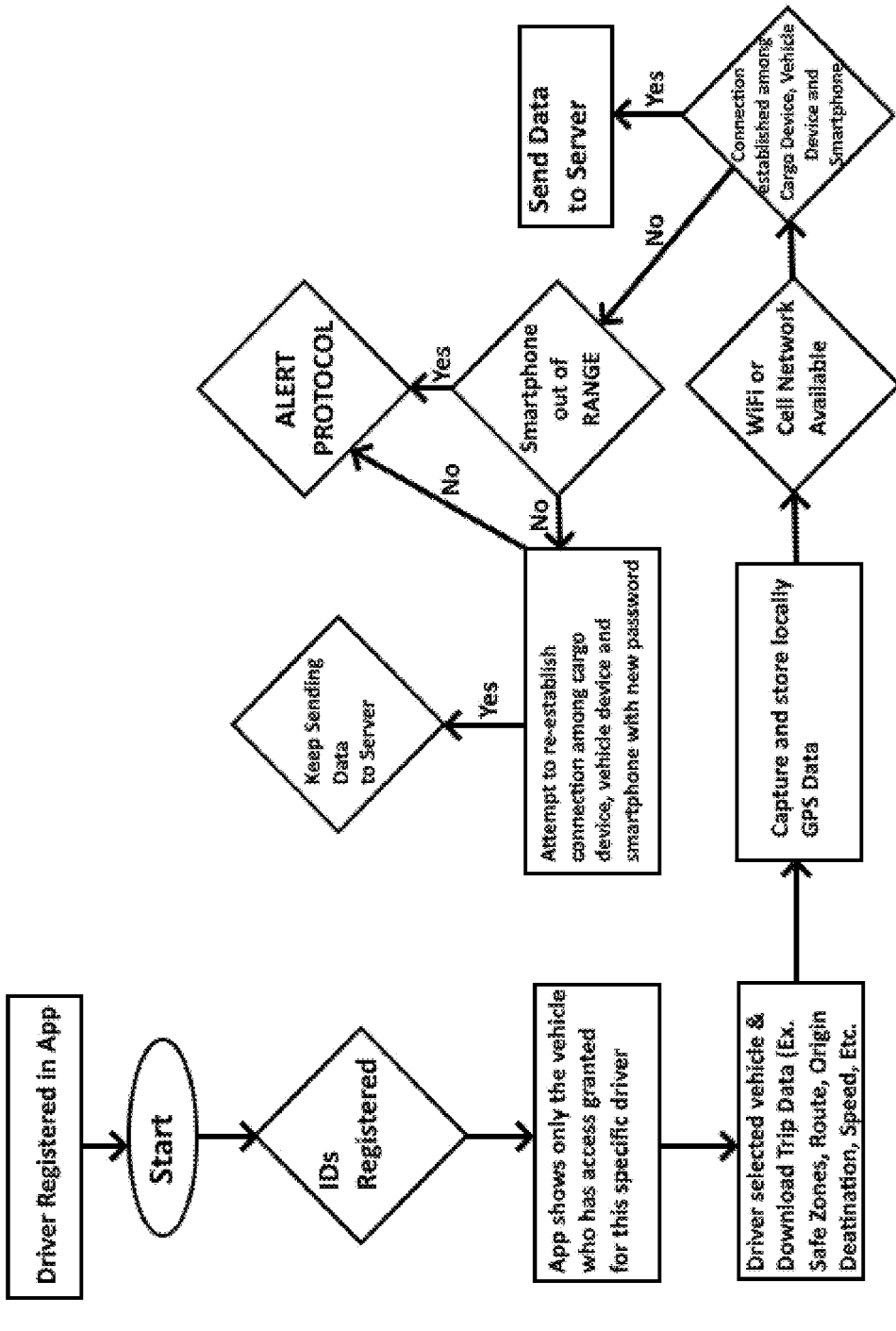

ANTIHACKER DIGITAL TAMPER SWITCH TO TRACK CARGO BEING TRANSPORTED

BACKGROUND OF THE INVENTION

1. Field of the Invention

The present invention is directed to prevent hacking of a system for tracking cargo being transported in a vehicle, wherein the system by means of a computer server receives dynamic data from the smartphone of the operator of the vehicle transporting the cargo by means of an application in the smart phone, wherein the smart phone application is dynamically activated wirelessly by a first device attached to the vehicle transporting the cargo and a second device attached to the cargo, wherein the first device, the second device and the smart phone are in a continuous wireless communication, wherein the data from the vehicle and continuous communication is relayed to the computer server by the application in the smart phone of the operator of the vehicle transporting the cargo by means of the internet of things.

2. Description of Prior Art

To address the perennial need to reduce mishaps and loss of cargo shipments transported in vehicles, there are many described methods and systems based on devices that scan labels or identifiers in the shipments and on global position system (GPS) devices attached to the vehicles transporting the shipments. However, there is no description of a system that prevents hacking and provides continuous communication among the operator of the vehicle transporting a shipment, the shipment, and the vehicle, wherein a rupture of the continuous communication may indicate a potential mishap or loss of the shipment.

The present invention provides a system that prevents hacking, and monitors the driver of a vehicle transporting a cargo, the vehicle and the cargo by means of an application in the smartphone of the operator, wherein the application is activated wirelessly by a first device attached to the vehicle transporting the cargo and a second wireless device attached to the cargo, wherein the smartphone, the first device and the second device maintain continuous wireless communication, and wherein the smartphone is relaying the data generated by the smartphone application to a servers by means of the internet of things.

SUMMARY OF THE INVENTION

The present invention provides a system for monitoring a vehicle transported cargo shipment, the vehicle and its operator to address or prevent potential mishaps and loss of the cargo, wherein the system uses the smartphone of the operator of the vehicle and an application in the smart phone, wherein the application is activated by a first wireless communicating device placed in the vehicle, a second wireless communicating device attached to the cargo as long as the cargo is in the vehicle; wherein the smartphone, the first device and the second device maintain continuous wireless communication, wherein the application in the smartphone generates dynamic data about the vehicle and about the continuous communication among the first device, the second device and the smartphone; and wherein the application sends the dynamic data to at least one computer server by means of the internet of things, wherein the continuous wireless communication when interrupted causes a digital switch in the communication devices and the smartphone to change IDs by generating a new encrypted password from a predetermined encrypted password list in order to re-establish the communication, wherein if the communication is not re-established within a determined period an alarm signal is generated by the smartphone application, and an anomaly is reported to the server.

Specifically, the present invention provides a system for tracking transported cargo in a vehicle comprising:

a. a first wireless communicating device placed in the vehicle transporting the cargo;

b. a second wireless communicating device placed in the cargo being transported by the vehicle;

c. a smart phone with an application, wherein the smartphone is with the vehicle's operator, wherein the first device constantly communicates with the second device, wherein the first device and the second device constantly communicates wirelessly with the smart phone of the operator of the vehicle, wherein the continuous communication among the first device, the second device and the smartphone maintains activated an application in the smart phone, wherein the smartphone application contains a digital switch with a predetermined list of at least two encryption keys and at least two encrypted passwords, wherein the activated application in the smartphone generates dynamic data about the vehicle;

d. at least one computer server, wherein the smart phone sends the dynamic data about the vehicle, by means of the internet of things, to the computer server;

wherein the first device, the second device, the smart phone, and the computer server are pre-programmed with the same digital switch and the same list of a pre-determined number of encryption keys for the list of encrypted passwords, wherein the wireless communication among first device, the second device, the smart phone, and the computer server is maintained by each of these components being pre-programmed to decipher the same encrypted password, wherein a rupture of communication will cause the digital switch in the smartphone to generate another listed encryption key for another listed encrypted password in all the components of the system in order to overcome the ruptured communication and re-establish communication among first device, the second device, the smart phone, and the computer server, wherein there is a predetermined time to re-establish communication before a disconnect signal is generated, wherein there is a predetermined time on non-communication before an alarm signal is generated.

Objectives and advantages of the present Application invention will be more evident in the detailed description of the invention and the claims.

BRIEF DESCRIPTION OF THE DRAWINGS

FIG. 1. is an flow chart showing an embodiment of the system of the present invention wherein a smartphone of a vehicle operator establish a continuous wireless communication or connection with a device in the vehicle and another device in the vehicle's cargo, wherein the smartphone sends dynamic data to a server, wherein if the wireless connection among the smartphone, the vehicle device and the cargo device is interrupted, the system attempts to re-establish the connection among the smartphone, the vehicle device and the cargo device with a new encrypted password, and wherein if the wireless communication among the smartphone, the vehicle device and the cargo device is not re-established an alert protocol is generated.

DETAILED DESCRIPTION OF THE INVENTION

FIG. 1 shows an illustration of an embodiment of a system for tracking transported cargo in a vehicle comprising:
  a. a first wireless communicating device placed in the vehicle transporting the cargo;
  b. a second wireless communicating device placed in the cargo being transported by the vehicle;
  c. a smart phone with an application, wherein the smartphone is with the vehicle's operator, wherein the first device constantly communicates with the second device, wherein the first device and the second device constantly communicates wirelessly with the smart phone of the operator of the vehicle, wherein the continuous communication among the first device, the second device and the smartphone maintains activated an application in the smart phone, wherein the smartphone application contains a digital switch with a predetermined list of at least two encryption keys and at least two encrypted passwords, wherein the activated application in the smartphone generates dynamic data about the vehicle;
  d. at least one computer server, wherein the smart phone sends the dynamic data about the vehicle, by means of the internet of things, to the computer server.
  wherein the first device, the second device, the smart phone, and the computer server are pre-programmed with the same digital switch and the same list of a pre-determined number of encryption keys for the list of encrypted passwords, wherein the wireless communication among first device, the second device, the smart phone, and the computer server is maintained by each of these components being pre-programmed to decipher the same encrypted password, wherein a rupture of communication will cause the digital switch in the smartphone to generate another listed encryption key for another listed encrypted password in all the components of the system in order to overcome the ruptured communication and re-establish communication among first device, the second device, the smart phone, and the computer server, wherein there is a predetermined time to re-establish communication before a disconnect signal is generated, wherein there is a predetermined time on non-communication before an alarm signal is generated.

For the purpose of the present invention a server refers to a computer server.

For the purpose of the present invention the term wireless communication can also be referred as a wireless connection.

For the purpose of the present invention a wireless communication refers to a communication among a smartphone and other devices using Bluetooth wireless technology or any other wireless communication technology used by smartphones.

In one aspect of the inspection system of the present invention, the server receives data from the application in the smart phone of the operator of the vehicle by means of the Internet of Things (IoT), wherein the IoT for the purpose of the present invention is defined as an arrangement of sensors, geographical beacons, communicating mobile phone towers, satellites, computing devices, computer servers, routers, communicating devices, mechanical and digital machines, objects, animals, people etc., that are provided with unique identifiers (UIDs) and the ability to transfer data from one component of the arrangement to another component of the arrangement, and over a network or networks.

For the purpose of the present invention, when the wireless communication among the smartphone, the vehicle device and the cargo device is not re-established an alert protocol is generated; wherein the time of wireless communication rupture among the smartphone, the vehicle device and the cargo device to generate an alert protocol is a predetermined time within a range between 5 minutes and 60 minutes; wherein there the predetermined time to re-establish communication before a disconnect signal is generated is anytime less than 5 minutes, wherein after the disconnect signal, if there is no re-establishment of the wireless communication among the smartphone, the vehicle device and the cargo device the alarm signal and alarm protocol are generated.

For the purpose of the present invention a smart phone is a cell mobile communicating device that connects to the IoT and can relay information to computer server. The smart phone of the present invention will be equipped with features now common in current smart phones, wherein the features comprise but are not limited to a GPS sensor, a gyroscope, an accelerometer, a barometer, a magnetometer, ambient light sensor, proximity sensor, time clock, Bluetooth, wifi, etc.

The application installed in the vehicle operator's smartphone for the purpose of the present invention, is an application that is only activated when actively communicating with the first device in the vehicle and the second device in the vehicle's cargo, wherein the activation of the application happens preferably by means of the Bluetooth smart phone feature, and a Bluetooth feature built in the first device and second device, wherein the first device and second device have built in battery to self-power, wherein the first device is in a hidden location in the vehicle, wherein the second device is hidden in the vehicle's cargo, wherein the hidden locations are not known to the vehicle's operator, wherein the first device and second device have built in transmitter and receiving wireless features, wherein the first device and second device and the smartphone are constantly communicating and constantly broadcasting an encrypted key or code to among themselves that maintains the application activated, wherein the application activation is interrupted when the vehicle's operator moves away more than a defined distance from the vehicle, or the cargo is away more than a defined distance from the vehicle, where the defined distance is within a range of 20 to 100 meters.

For the purpose of the present invention the vehicle device, the cargo device and the smartphone have built-in GPS, wherein the vehicle device, the cargo device and the smartphone are able to broadcast their GPS location by means of the IoT.

For the purpose of the present invention when an ALERT PROTOCOL (FIG. 1) is generated, the server or servers of the system are able to use GPS location technology to locate the vehicle device, the cargo device and the smartphone.

For the purpose of the present invention a digital switch is an electronic component, a software component, or a combination of a software and electronic components, able to store a predetermined list of encrypted passwords, and encrypted keys and able to select one of the passwords from the list to be transmitted wirelessly.

For the purpose of the present application the server or servers of the invention also contain the same digital switch and list of encrypted passwords of the smartphone, the vehicle device and the cargo device.

For the purpose of the present invention the term vehicle refers to any vehicle capable of transporting cargo or shipments, wherein the term vehicle comprises but is not limited to a car, a truck, any vehicle with at least two wheels, a train, a water vessel, an airplane, etc.

For the purpose of the present invention the term dynamic data refers to data regarding events, e.g., trip data, safe zones, routes, origin, destinations, speed, etc., occurring constantly in real time.

Although this description presents preferred embodiments of the present invention, additional changes may be made in the form and disposition of the parts without deviating from the ideas and basic principles encompassed by the claims.

The invention claimed is:

1. A system for tracking transported cargo in a vehicle comprising:

a. a first wireless communicating device placed in the vehicle transporting the cargo;

b. a second wireless communicating device placed in the cargo being transported by the vehicle;

c. a smart phone with an application, wherein the smart phone is with the vehicle's operator, wherein the first device constantly communicates with the second device, wherein the first device and the second device constantly communicates wirelessly with the smart phone of the operator of the vehicle, wherein the continuous communication among the first device, the second device and the smart phone maintains activation of the application in the smart phone, wherein the smart phone application contains a digital switch with a predetermined list of at least two encryption keys and at least two encrypted passwords, wherein the activated application in the smart phone generates dynamic data about the vehicle;

d. at least one computer server, wherein the smart phone sends the dynamic data about the vehicle, by means of the internet of things, to the computer server;

wherein the first device, the second device, the smart phone, and the computer server are pre-programmed with the same digital switch and the same list of a pre-determined number of encryption keys for the list of encrypted passwords, wherein the wireless communication among the first wireless device, the second wireless device, the smart phone, and the computer server is maintained by each of these components being pre-programmed to decipher the same encrypted password, wherein a rupture of communication will cause the digital switch in the smart phone to generate another listed encryption key for another listed encrypted password in all the components of the system in order to overcome the ruptured communication and re-establish communication among the first wireless device, the second wireless device, the smart phone, and the computer server, wherein there is a predetermined time to re-establish communication before a disconnect signal is generated, wherein there is a pre-determined time of non-communication before an alarm signal is generated.

* * * * *